(12) United States Patent
Nagayama

(10) Patent No.: US 12,369,594 B2
(45) Date of Patent: Jul. 29, 2025

(54) NOODLE CUTTING DEVICE, NOODLE PRODUCTION DEVICE, NOODLE, AND INSTANT NOODLE PRODUCTION METHOD

(71) Applicant: SANYO FOODS CO., LTD., Tokyo (JP)

(72) Inventor: Yoshiaki Nagayama, Tokyo (JP)

(73) Assignee: SANYO FOODS CO., LTD., Tokyo (JP)

( * ) Notice: Subject to any disclaimer, the term of this patent is extended or adjusted under 35 U.S.C. 154(b) by 689 days.

(21) Appl. No.: 17/788,162

(22) PCT Filed: Dec. 23, 2019

(86) PCT No.: PCT/JP2019/050416
§ 371 (c)(1),
(2) Date: Jun. 22, 2022

(87) PCT Pub. No.: WO2021/130827
PCT Pub. Date: Jul. 1, 2021

(65) Prior Publication Data
US 2023/0023072 A1    Jan. 26, 2023

(51) Int. Cl.
*A21C 11/22* (2006.01)
*A21C 11/24* (2006.01)

(52) U.S. Cl.
CPC .............. *A21C 11/22* (2013.01); *A21C 11/24* (2013.01)

(58) Field of Classification Search
CPC ................................ A21C 11/24; A23L 7/109
See application file for complete search history.

(56) References Cited

U.S. PATENT DOCUMENTS 4,534,251 A * 8/1985 Wilson ................. B26D 7/1818
83/113
4,889,291 A * 12/1989 Goldhammer ...... B02C 18/0007
241/236

(Continued)

FOREIGN PATENT DOCUMENTS

JP    S38-005788 Y1    4/1963
JP    H10-210924 A    8/1998

(Continued)

OTHER PUBLICATIONS

International Search Report for PCT/JP2019/050416 mailed Mar. 10, 2020. (6 pages, with English Translation).

*Primary Examiner* — Woody A Lee, Jr.
(74) *Attorney, Agent, or Firm* — Merchant & Gould P.C.

(57) ABSTRACT

Provided are a noodle cutting device and a noodle production device that are capable of reducing or preventing adhesion between noodles (52a, 52b), particularly thick noodles. This noodle cutting device comprises: a pair of cutting blade rolls (10a, 10b) having a plurality of annular grooves (12a, 12b) arranged in parallel so as to face and mesh with each other; plate-shaped sections (24a, 24b) that extend along the longitudinal direction of the cutting blade rolls; scrapers (20a, 20b) having a plurality of protrusions (22a, 22b) on a long side of the plate-shaped sections and extending in a direction substantially orthogonal to the long side, said scrapers being configured such that the each of the plurality of protrusions engage with the corresponding annular groove among the plurality of annular grooves in the cutting blade rolls and peels noodles that are in the plurality of annular grooves from the cutting blade rolls; and comb plates (30a, 30b) having a plurality of protrusions (32a, 32b) arranged displaced from the center of the plurality of annular grooves, along the longitudinal direction of the cutting blade rolls, and being arranged such that the plurality of protru- (Continued)

sions are in contact with the noodles at a position at which the noodles are not in contact with the cutting blade rolls or the plurality of protrusions in the scrapers.

10 Claims, 11 Drawing Sheets

(56)　　　　　　References Cited

U.S. PATENT DOCUMENTS

| | | | |
|---|---|---|---|
| 10,737,274 B2* | 8/2020 | Schneider | ............ B02C 18/2283 |
| 2011/0138636 A1 | 6/2011 | Ishii et al. | |
| 2011/0138979 A1* | 6/2011 | Yoshida | ................. A21C 11/24 |
| | | | 83/122 |
| 2013/0251876 A1 | 9/2013 | Nagayama | |

FOREIGN PATENT DOCUMENTS

| | | | | |
|---|---|---|---|---|
| JP | 2010-187623 A | | 9/2010 | |
| JP | WO2010140385 A1 | * | 12/2010 | ............. A21C 11/00 |
| JP | 2011-000001 A | | 1/2011 | |
| JP | 4860773 B1 | * | 1/2012 | ............. A21C 11/24 |
| JP | 2012-170363 A | | 9/2012 | |
| KR | 10-0950390 | * | 3/2010 | ............. A21C 11/00 |
| WO | 2010/041477 A | | 4/2010 | |
| WO | WO-2010041477 A1 | * | 4/2010 | ............. A21C 11/00 |

* cited by examiner

NOODLE CUTTING DEVICE, NOODLE PRODUCTION DEVICE, NOODLE, AND INSTANT NOODLE PRODUCTION METHOD

This application is a National Stage Application of PCT/JP2019/050416, filed Dec. 23, 2019, and which application is incorporated herein by reference. To the extent appropriate, a claim of priority is made to the above disclosed application.

FIELD

The present invention relates to a noodle strand cutting device, a noodle production apparatus comprising the noodle strand cutting device, and noodles and a method for producing instant noodles using the noodle strand cutting device.

BACKGROUND

Machine-made noodles, such as Chinese noodles, udon, and pasta, are produced by passing a kneaded product (also referred to as "dough") obtained by kneading, for example, a main raw material, such as wheat flour and starch, with auxiliary raw materials, such as water, salt, and brine, through rolling rollers to form a sheet-shaped raw noodle belt, and cutting and separating a noodle belt, which is obtained by stacking two raw noodle belts by a compound machine and passing them through subsequent rolling rollers to thin them to a predetermined thickness, into a plurality of noodle strands using a noodle strand cutting device comprising a pair of cutting rollers having a plurality of annular grooves. The noodle belt is fed between the pair of cutting rollers and cut into a plurality of noodle strands by the plurality of annular grooves. After cutting, the noodle strands in the annular grooves are removed from the annular grooves of each cutting roller by a scraper having a plurality of protrusions which engage with the plurality of annular grooves of the cutting rollers. The removed noodle strands form a noodle strand bundle which is removed from one (for example, the upper) cutting roller and a noodle strand bundle which is removed from the other (for example, the lower) cutting roller. The noodle strands of the two noodle strand bundles either fall directly onto a conveyor located directly under the noodle strand cutting device, or once accepted by a guide, are crimped vertically into a wavy shape while passing through the guide, and are then transferred onto the conveyor from the outlet of the guide. Thereafter, the noodle strands are formed into a noodle product through steps, such as steaming, cutting into single meal units, and drying.

It is known that by crimping the noodle strands inside the guide, gaps are created between the noodle strands, and the contact area between the noodle strands of one (for example, the upper) noodle strand bundle and the noodle strands of the other (for example, the lower) noodle strand bundle is reduced, which reduces or prevents adhesion between noodle strands that may adversely affect subsequent steaming and handling. Attempts have also been made to reduce or prevent adhesion between adjacent noodle strands of the same noodle strand bundle.

Patent Literature 1 (JP H10-210924 A) describes a "scraper for a noodle cutting roller for cutting a band-shaped noodle dough into noodle strands, in which two cylindrical cutting rollers having a plurality of circumferentially-formed cutting blades disposed along the longitudinal directions thereof are provided in parallel in a state in which the cutting blades mesh with each other, wherein a contact angle of the scraper, which contacts the insides of grooves formed between the cutting blades and scrapes noodle strands from the grooves, is set in the range of 10° to 50° with respect to the cutting rollers."

Patent Literature 2 (JP 2010-187623 A) describes a "noodle production cutting device 200" which comprises "a first cutting roller 210a, a second cutting roller which is arranged so as to mesh at a meshing position 10, a first chisel 230a in which each of a plurality of first tooth tips 234a is arranged at a position of 5° to 90° from the meshing position 10 in a first rotation direction R1 centered on a first rotation axis C1, a second chisel 240a in which each of a plurality of second tooth tips 243a is arranged at a position of 120° to 210° from the meshing position 10 in the first rotation direction R1 centered on the first rotation axis C1, a third chisel 230b in which each of a plurality of third tooth tips 234b is arranged at a position of 5° to 90° from the meshing position 10 in a second rotation direction R2 centered on a second rotation axis C2, and a fourth chisel 240b in which each of a plurality of second tooth tips 243b is arranged at a position of 120° to 210° from the meshing position 10 in the second rotation direction R2 centered on the second rotation axis C2."

Patent Literature 3 (WO 2010/041477) describes an "An apparatus for cutting and ejecting noodles, comprising: a pair of cutting blade rolls at which a plurality of toroidal-groove sections is formed, the cutting blade rolls cutting a noodle band and ejecting a plurality of noodles, the plurality of toroidal-groove sections having two or more depths, and the plurality of toroidal-groove sections being formed so as to be alternately or sequentially arrayed; a noodle scraper comprising a plate body having a bent section extending along a longitudinal direction, the noodle scraper including a plurality of scraping tines formed in a comb form, the scraping tines being provided at one of long sides of the plate body and engaged with each of the toroidal-groove sections; a guide section disposed under the noodle scraper for transporting a plurality of the noodles that are dropped from the cutting blade rolls; and a feeding conveyer disposed under the guide section for feeding the plurality of noodles, wherein each scraping tine includes a tine-edge section, wherein the plurality of tine-edge sections are engaged with the plurality of toroidal-groove sections at a front position and a rear position in a circumferential direction of the cutting blade rolls, in accordance with the depths of the toroidal-groove sections engaged with the scraping tines."

CITATION LIST

Patent Literature

[PTL 1] JP H10-210924 A
[PTL 1] JP 2010-187623 A
[PTL 3] WO 2010/041477

SUMMARY

Technical Problem

Wide noodle strands may be desired for some noodles, such as udon and pasta. When forming wide noodle strands using a noodle strand cutting device, a cutting roller having wide annular grooves is conventionally used. When the wide noodle strands removed from the annular grooves of the cutting roller are vertically crimped inside a guide, due to the noodle strands being wide, the contact area between the noodle strands of one noodle strand bundle and the noodle strands of another noodle strand bundle is still large, and within the same noodle strand, the contact area between wide parts before and after crimped portions is larger than the case of narrow noodle strands, whereby adhesion between a plurality of noodle strands or within the same noodle strand cannot be sufficiently reduced or prevented. This is even more pronounced when the wide noodle strands are dropped directly onto a conveyor without crimping inside a guide. Adhesion between noodle strands may cause insufficient gelatinization of the noodle strands during steaming, unraveling of noodle strands during eating, etc., which may have a significant adverse effect on product quality.

The present disclosure provides a noodle strand cutting device and a noodle production apparatus with which the adhesion between noodle strands, and in particular, between wide noodle strands, can be reduced or prevented.

Solution to Problem

The present inventors have discovered that by applying an external force to noodle strands removed from annular grooves of a cutting roller in a predetermined direction to change the orientation of the noodle strands, the adhesion between noodle strands can be reduced or prevented, and have completed the present invention.

The present invention encompasses the following embodiments [1] to [10].

[1]
A noodle strand cutting device, comprising:
a pair of cutting rollers, each having a plurality of annular grooves, which are arranged in parallel so that the annular grooves of one cutting roller face and mesh with those of the other cutting roller,
a scraper comprising a plate-shaped part which extends along a longitudinal direction of the cutting rollers and a plurality of protrusions extending on a long side of the plate-shaped part in a direction substantially orthogonal to the long side, each of the plurality of protrusions being configured so as to engage with a corresponding one of the plurality of annular grooves of the cutting rollers so that noodle strands in the plurality of annular grooves are scraped from the cutting rollers, and
a comb plate having a plurality of protrusions which are arranged so as to be shifted from the centers of the plurality of annular grooves along the longitudinal direction of the cutting rollers, the plurality of protrusions being configured so as to contact the noodle strands at positions where the noodle strands are not in contact with the cutting rollers and the plurality of protrusions of the scraper.

[2]
The noodle strand cutting device according to [1], wherein the plurality of protrusions of the comb plate have a raised shape which imparts a force onto the noodle strand in a direction orthogonal to a direction of travel of the noodle strand, which has been scraped from the cutting roller and separated from the scraper, and the width direction of the noodle strand.

[3]
The noodle strand cutting device according to [1] or [2], wherein the comb plate comprises a plate-shaped part which extends along the longitudinal direction of the cutting rollers and the plurality of protrusions on a long side of the plate-shaped part which extend in a direction substantially orthogonal to the long side, and the plate-shaped part of the comb plate is arranged overlaid on the plate-shaped part of the scraper.

[4]
The noodle strand cutting device according to any one of [1] to [3], wherein the plurality of protrusions of the comb plate are alternatingly arranged with respect to the plurality of annular grooves of the cutting rollers.

[5]
The noodle strand cutting device according to any one of [1] to [4], wherein the width of the annular grooves of the cutting rollers is 2.0 mm or more.

[6]
The noodle strand cutting device according to any one of [1] to [5], wherein the width of the plurality of protrusions of the comb plate is 50% or less the width of the annular grooves.

[7]
The noodle strand cutting device according to any one of [1] to [6], further comprising a guide for receiving the cut noodle strands.

[8]
A noodle production apparatus comprising the noodle strand cutting device according to any one of [1] to [7].

[9]
A method for producing noodles, comprising cutting a noodle belt formed from dough into a plurality of noodle strands using the noodle strand cutting device according to any one of [1] to [7].

[10]
A method for producing instant noodles, comprising:
cutting a noodle belt formed from dough into a plurality of noodle strands using the noodle strand cutting device according to any one of [1] to [7];
steaming and gelatinizing the plurality of cut noodle strands; and
drying the gelatinized noodle strands.

Advantageous Effects of Invention

According to the present invention, adhesion between noodle strands can be reduced or prevented, and in particular, adhesion between wide noodle strands can be effectively reduced or prevented. According to the present invention, wide noodles and instant noodles, such as udon and pasta, can be produced with high quality and high efficiency.

The above descriptions shall not be deemed to disclose all embodiments of the invention and all advantages relating to the invention.

DESCRIPTION OF EMBODIMENTS

Figure 1:
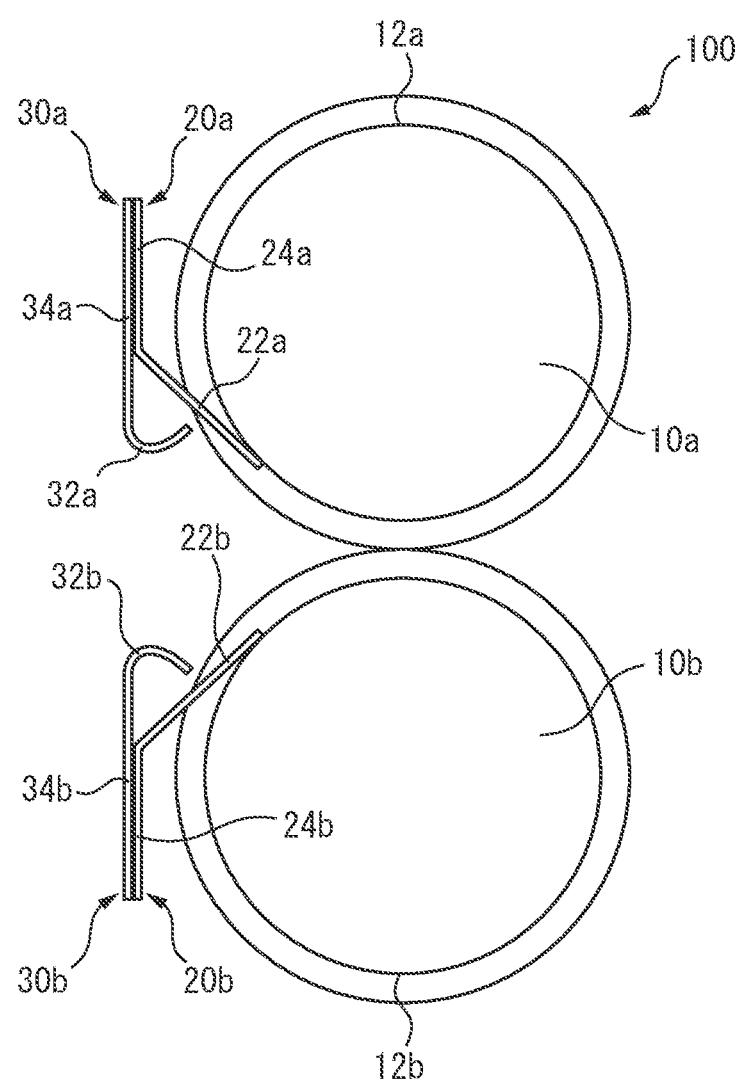
FIG. 1 is a schematic cross-sectional view of cutting rollers of a noodle strand cutting device according to an embodiment as viewed from the axial direction.

The present invention will be described in more detail below with reference to the drawings in order to illustrate typical embodiments of the present invention, but the present invention is not limited to these embodiments. Regarding the reference signs of the drawings, elements assigned similar signs in different drawings indicate similar or corresponding elements.

As used herein, "noodles" mean a food which comprises wheat flour, starch, rice flour, buckwheat flour, bean flour, etc., as the main ingredient, which is processed into a linear shape, and which can be eaten when cooked by boiling, simmering, stir-frying, hot water immersion, or heating in a microwave oven with or without water immersion. Examples of noodles include udon, kishimen noodles, Chinese noodles, soba, pasta, etc. Examples of the state of noodles before cooking include raw noodles, dried noodles, steamed noodles, boiled noodles, frozen noodles, and instant noodles.

As used herein, "instant noodles" mean, among the noodles, a food which can be stored for a long period of time by heating and drying raw noodles, steamed noodles, or boiled noodles, and removing the moisture contained in the noodles to approximately 2 to 10% by mass in the case of fry-drying, and to approximately 6 to 14.5% by mass in the case of hot-air drying. "Dried noodles" are noodles which do not include a gelatinization step in the production process and which are dried at room temperature or low temperature for a long period of time. In the present disclosure, dried noodles are distinguished from instant noodles and excluded from instant noodles.

As used herein, "dough" means a kneaded product of a main ingredient and auxiliary ingredients, such as water, salt, and brine. A kneader, planetary mixer, etc., can be used in the kneading of the main ingredient and the auxiliary ingredients. The shape of the dough is generally irregular, but it may be formed into a cylindrical shape, a square tubular shape, etc., using an extruder or the like after kneading.

As used herein, "noodle belt" means a product in which dough is processed into a sheet-like shape having a thickness suitable for being cut into noodle strands. As a processing method, two or three raw noodle belts, which are intermediates formed during rolling, are stacked by a compound machine and then further rolled through subsequent rollers. Another processing method is to extrude the dough directly into a sheet with an extruder.

As used herein, "noodle strands" mean noodles which are mechanically cut from a noodle belt by a noodle strand cutting device. The cross-sectional shape of noodle strands may be circular, elliptical, square, rectangular, or a combination of a part of these shapes, or a shape having a contour formed of a combination of the same shapes having different thicknesses, and the corners thereof may be chamfered.

As used herein, "noodle strand bundle" means a group of a plurality of noodle strands cut from a single cutting roller having a plurality of annular grooves arranged in parallel. When a noodle strand cutting device comprising a pair of cutting rollers is used, noodle strand bundles are output from the respective cutting rollers. These two noodle strand bundles are usually stacked and processed in subsequent steps.

As used herein, "orientation of noodle strand" means the orientation of the noodle strand in a width direction thereof. In noodle strands before the orientation thereof has been changed by the comb plate and noodle strands the orientation of which has not been changed, the orientation of the noodle strands substantially coincides with the longitudinal direction of the cutting rollers.

FIG. 1 is a schematic cross-sectional view of cutting rollers of a noodle strand cutting device according to an embodiment as viewed from the axial direction. The noodle strand cutting device 100 comprises a pair of cutting rollers 10a, 10b, each having a plurality of annular grooves 12a, 12b which are arranged in parallel so that the annular grooves of the cutting rollers face and mesh with each other; scrapers 20a, 20b comprising plate-shaped parts 24a, 24b which extend along a longitudinal direction of the cutting rollers 10a, 10b, and a plurality of protrusions 22a, 22b extending on long sides of the plate-shaped parts 24a, 24b in a direction substantially orthogonal to the long sides, each of the plurality of protrusions 22a, 22b being configured so as to engage with a corresponding one of the plurality of annular grooves 12a, 12b of the cutting rollers 10a, 10b so that noodle strands in the plurality of annular grooves 12a, 12b are scraped from the cutting rollers 10a, 10b; and comb plates 30a, 30b having a plurality of protrusions 32a, 32b which are arranged so as to be shifted from the centers of the plurality of annular grooves 12a, 12b along the longitudinal direction of the cutting rollers 10a, 10b, the plurality of protrusions 32a, 32b being configured so as to contact the noodle strands at positions where the noodle strands are not in contact with the cutting rollers 10a, 10b and the plurality of protrusions 22a, 22b of the scrapers 20a, 20b.

The noodle strand cutting device may further comprise, as needed, a guide for receiving the cut noodle strands. The guide may also be referred to as a conduit, guide tube, or "wavebox." The cutting rollers, scrapers, comb plates, and optional guide may be attached to a frame-shaped housing formed of stainless steel, iron, or the like.

Any known cutting rollers which are used in noodle strand cutting devices can be used as the pair of cutting rollers. The pair of cutting rollers have a plurality of annular grooves which are arranged in parallel so as to face and mesh with each other. There are convex parts between the plurality of annular grooves of the cutting rollers. Each cutting roller is connected to a drive device, such as a motor, via a gear, and by passing the noodle belt between the cutting rollers while rotating the pair of cutting rollers in opposite directions to each other, the noodle belt is cut into noodle strands by the convex parts of one cutting roller and the annular grooves of the other cutting roller. The noodle strands formed by cutting the noodle belt enter the annular grooves of the cutting rollers.

Stainless steel, iron, etc., can be used as the material of the cutting rollers.

In an embodiment, the pair of cutting rollers are arranged aligned in the horizontal direction, and the noodle strands scraped with the scrapers move (fall) in the vertical direction. In another embodiment, the pair of cutting rollers are arranged side by side at an angle of greater than 0 degrees and 90 degrees or less from the horizontal direction, and the noodle strands scraped by the scrapers fall while moving diagonally downward.

The cross-section of the annular grooves may be semi-circular, semi-elliptical, square, rectangular, triangular, or a combination of a part of these shapes, or a shape having a contour formed of a combination of the same shapes having different annular groove depths, and the corners thereof may be chamfered. The convex parts between the annular grooves can be planar surfaces, curved surfaces, a combination of two or more planar surfaces, or a combination of a curved surface and one or more planar surfaces.

In an embodiment, the width of the annular grooves is 2.0 mm or more, 2.3 mm or more, 2.6 mm or more, 3.2 mm or more, 3.5 mm or more, 3.8 mm or more, or 4.5 mm or more, and is 30 mm or less, 15 mm or less, or 10 mm or less. The width of the annular grooves is preferably 2.3 mm or more, more preferably 3.2 mm or more, and further preferably 3.5 mm or more. In an embodiment, the width of the annular grooves is 2.0 mm to 30 mm 2.3 mm to 15 mm, or 3.2 mm to 10 mm. The present invention is more effective for wide noodle strands cut by such relatively large width annular grooves. In the present disclosure, noodles formed from cutting rollers having annular grooves having a width of 2.0 mm or more are referred to as wide noodles, and examples of wide noodles include udon, certain pastas, such as fettucine, specific local noodles, such as Sano ramen, Kitakata ramen, and Okinawa soba, as well as kishimen noodles, flat noodles, etc. If the width of the annular grooves is 30 mm or less, various wide noodles as described above can be produced by conventional production processes.

Any known scraper which is used in noodle strand cutting devices can be used as the scrapers. The scraper has a plate-shaped part extending along the longitudinal direction of the cutting rollers, and a plurality of protrusions extending on a long side of the plate-shaped part in a direction substantially orthogonal to the long side. Each of the plurality of protrusions engages with a corresponding one of the plurality of annular grooves of the cutting rollers so that noodle strands in the plurality of annular grooves are scraped from the cutting rollers. The noodle strands scraped from one of the cutting rollers form a noodle strand bundle composed of a group of a plurality of noodle strands aligned along the axial direction of the cutting rollers, and move in the vertical direction or along the downward inclined direction. Thus, two noodle strand bundles are formed from the pair of cutting rollers. The scraper can also be referred to as a chisel. In rare cases, the remnants of noodle strands may remain on the cutting rollers. In order to remove the noodle strand remnants from the cutting rollers, the scraper may be provided with a plurality of protrusions each of which is in contact with one of the convex parts between the plurality of annular grooves.

The plate-shaped part of the scraper functions as a support member for holding the plurality of protrusions at predetermined positions, and can also absorb the stresses applied to the plurality of protrusions. The scraper can be affixed to a housing with bolts or the like using the plate-shaped part of the scraper.

The plurality of protrusions of the scraper may extend straight or may include bent portions or curved portions. The corners of the plurality of protrusions may be chamfered.

The scraper can be obtained by forming comb-shaped notches on one side of one plate to form the plurality of protrusions. The plate may be bent so as to have one or two or more obtuse angles, and a portion corresponding to the plurality of protrusions, a portion corresponding to the boundary between the plurality of protrusions and the plate-shaped part, or both may be bent or curved. As the material of the scraper, brass, phosphor bronze, stainless steel or the like can be used. Brass and phosphor bronze are easy to process, and stainless steel has excellent durability.

The comb plate has a plurality of protrusions which are arranged so as to be shifted from the centers of the plurality of annular grooves along the longitudinal direction of the cutting rollers. The plurality of protrusions of the comb plate contact the noodle strands at positions where the noodle strands are not in contact with the cutting rollers and the plurality of protrusions of the scraper. This makes it possible to rotate the orientation of the noodle strands while they are being scraped and moved from the cutting rollers in a plane orthogonal to the direction of travel of the noodle strands. As a result, the noodle strand bundles can be stacked so that the wide parts of the noodle strands of the noodle strand bundle formed from one cutting roller and the wide parts of the noodle strands of the noodle strand bundle formed from the other cutting roller do not contact each other, whereby adhesion between noodle strands can be reduced or prevented.

Figure 3:
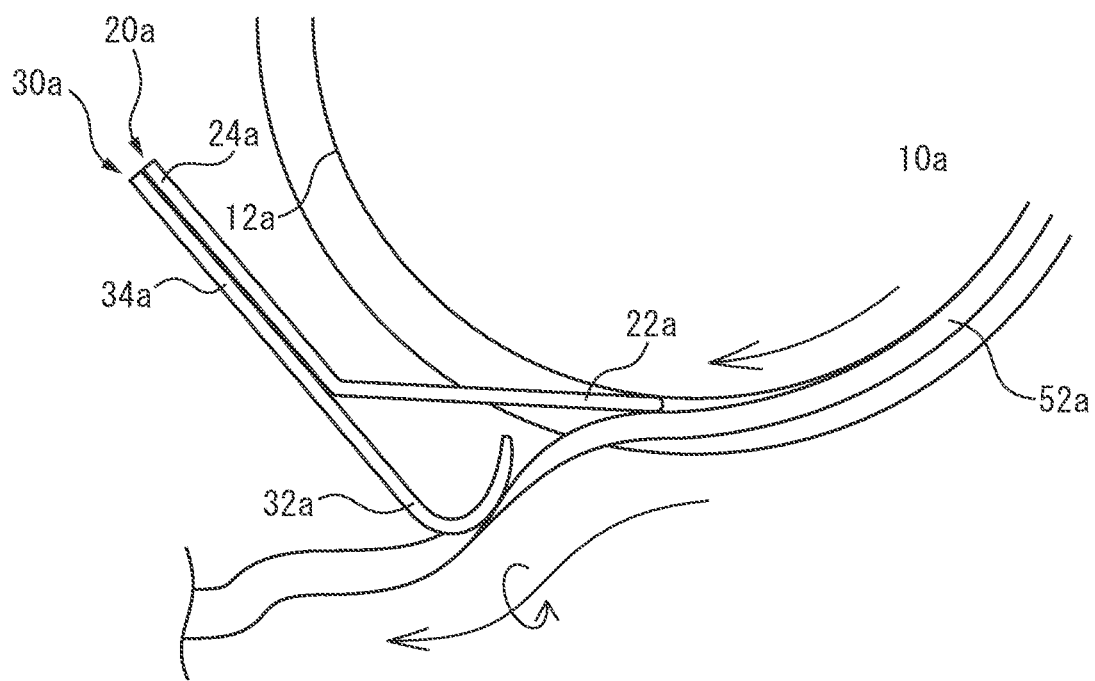
FIG. 3 is a schematic cross-sectional view detailing a state in which the orientation of a noodle strand scraped from a cutting roller is changed by a comb plate.

FIG. 3 is a schematic cross-sectional view detailing a state in which the orientation of a noodle strand scraped from a cutting roller is changed by a comb plate. In FIG. 3, a noodle strand 52a in the annular groove 12a of one cutting roller 10a is scraped from the cutting roller by the protrusion 22a of the scraper 20a engaged with the annular groove 12a, and moves diagonally downward. The protrusion 32a of the comb plate 30a contacts the noodle strand 52a at a position where the noodle strand 52a is not in contact with the cutting roller 10a and the protrusion 22a of the scraper 20a. Since the protrusion 32a of the comb plate 30a is arranged shifted from the center of the annular groove of the cutting roller 10a (arranged toward the front side along a direction perpendicular to the sheet of FIG. 3), the noodle strand 52a contacts the protrusion 32a on one side of the width orthogonal to the direction of travel thereof (the front side along a direction perpendicular to the sheet of FIG. 3), and a force is applied in the direction orthogonal to the direction of travel and the width direction of the noodle strand 52a. As a result, the orientation of the noodle strand 52a which is being scraped and moved from the cutting roller 10a rotates in a plane orthogonal to the direction of travel of the noodle strand 52a.

The orientation of all noodle strands contained in one noodle strand bundle may be rotated in a plane orthogonal to the direction of travel thereof, or the orientation of some noodle strands contained in one noodle strand bundle may be rotated in a plane orthogonal to the direction of travel thereof, and the orientation of the remaining noodle strands need not be rotated in a plane orthogonal to the direction of travel thereof.

As shown in FIGS. 1 and 3, the plurality of protrusions of the comb plates are neither engaged with nor inserted into the plurality of annular grooves of the cutting rollers. Thus, the comb plate does not have a function to scrape noodle strands in the plurality of annular grooves of the cutting rollers.

Figure 4:
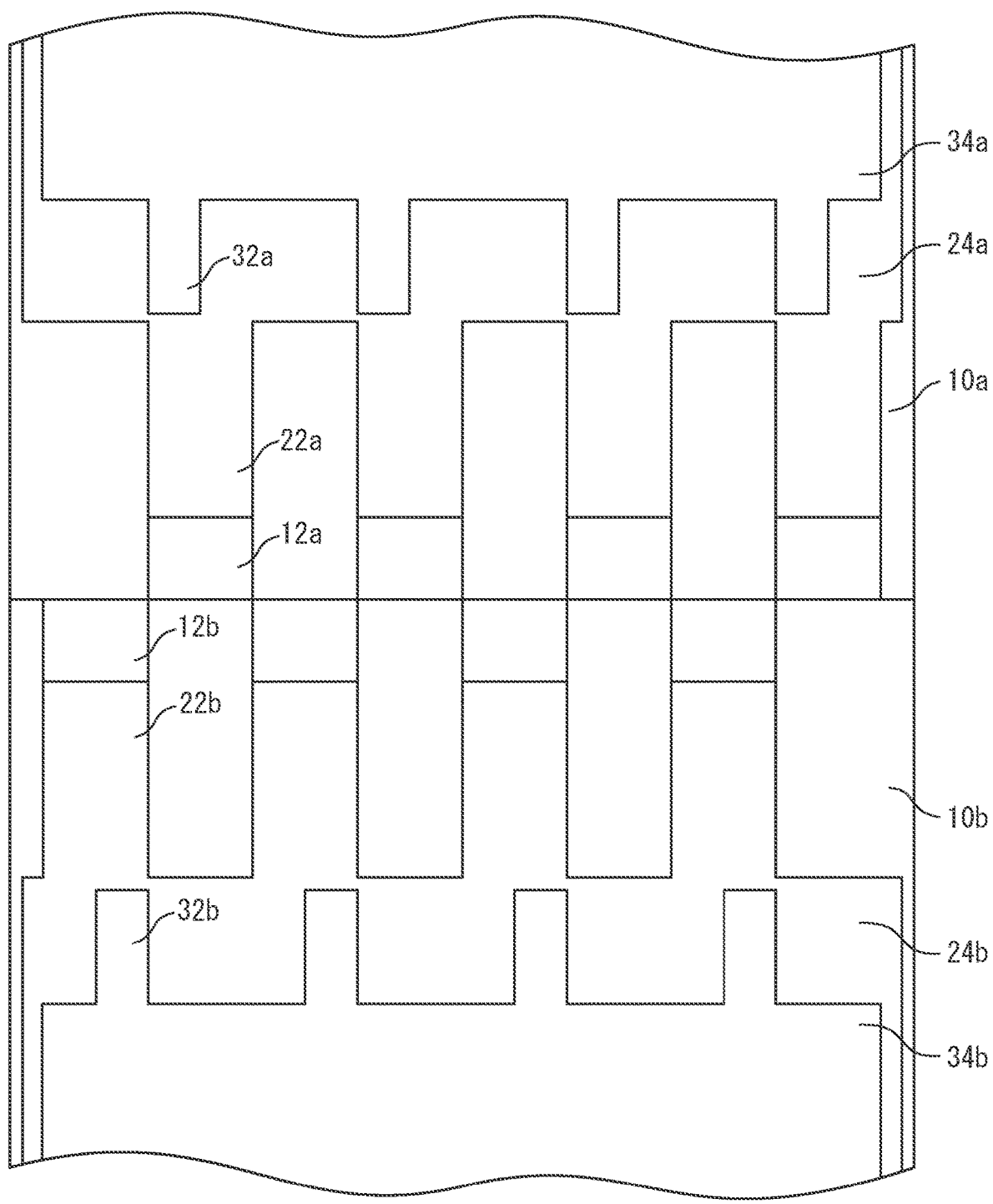
FIG. 4 is a schematic plan view of a noodle strand cutting device according to a first embodiment as viewed from the front of the side where the noodle strands are output.

FIG. 4 shows a schematic plan view of the noodle strand cutting device of the first embodiment as viewed from the front of the side where the noodle strands are output. In FIG. 4, the plurality of protrusions 22a, 22b of the scrapers engage with the respective plurality of annular grooves 12a, 12b of the cutting rollers 10a, 10b, and the plurality of protrusions 32a, 32b of the comb plates are arranged with respect to the respective plurality of annular grooves 12a, 12b of the cutting rollers 10a, 10b.

In FIG. 4, when the direction in which the plurality of protrusions 22a, 22b of the scrapers extend from the plate-shaped parts 24a, 24b of the scrapers is defined as an upward direction, all of the protrusions 32a, 32b of the comb plates are shifted to the fight from the centers of the annular grooves 12a, 12b when viewed from the side of the plate-shaped parts 34a, 34b of the comb plates. In the embodiment shown in FIG. 4, the orientations of the noodle strands of the upper noodle strand bundle cut by the cutting roller 10a and the noodle strands of the lower noodle strand bundle cut by the cutting roller 10b rotate in the same direction in a plane orthogonal to the direction of travel of the noodle strands, i.e., clockwise in that plane. In other words, in the embodiment shown in FIG. 4, the orientations of the noodle strands of the upper noodle strand bundle cut by the cutting roller 10a are changed when the left sides thereof in FIG. 4 contact the protrusions 32a of the comb plate, and conversely, the orientations of the noodle strands of the lower noodle strand bundle cut by the cutting roller 10b are changed when the right sides thereof in FIG. 4 contact the protrusions 32b of the comb plate. As a result, when directly viewed from the top of the conveyor, the upper noodle strand bundle and the lower noodle strand bundle are stacked in a state in which the orientations thereof are changed in opposite directions. In some other embodiments, all of the protrusions 32a are shifted to the right from the centers of the annular grooves 12a, and all of the protrusions 32b are shifted to the left from the centers of the annular grooves 12b; all of the protrusions 32a are shifted to the left from the centers of the annular grooves 12a, and all of the protrusion 32b are shifted to the right from the centers of the annular grooves 12b; or alternatively, the protrusions 32a, 32b are all shifted to the left from the centers of the annular grooves 12a, 12b.

In the first embodiment, each of the plurality of protrusions of the comb plates may be shifted from the center of the annular groove on a side different from that of a protrusion adjacent along the longitudinal direction of the cutting rollers. For example, when the direction in which the plurality of protrusions of the scrapers extend from the plate-shaped parts of the scrapers is defined as an upward direction, in the case in which one protrusion of a comb plate is shifted to the right from the center of the annular groove when the noodle strand cutting device is viewed from the front of the side where the noodle strands are output, one or two adjacent protrusions along the longitudinal direction of the cutting roller may be shifted to the left from the center(s) of the annular groove(s) and vice versa.

In the first embodiment, each of the plurality of protrusions of the comb plates may be shifted from the center of the corresponding annular groove of the plurality of annular grooves to a non-regular side, may be shifted at an irregular distance, or may be shifted by a combination of these.

Figure 2A:
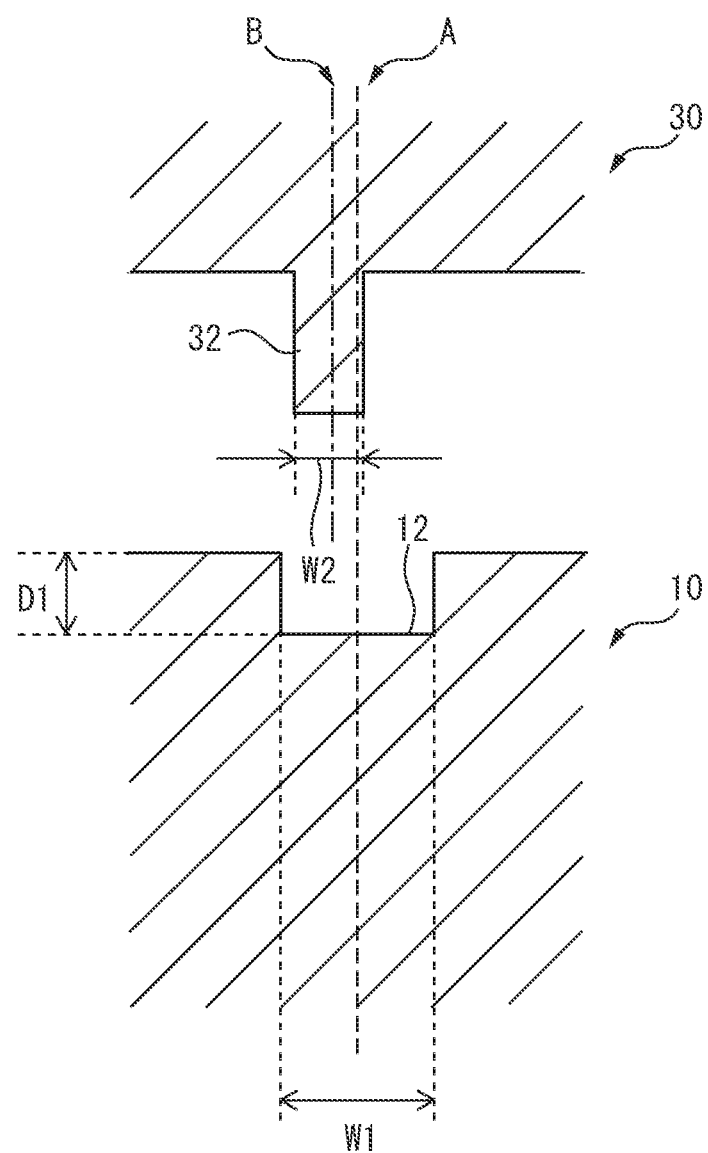
FIG. 2A is a schematic cross-sectional view showing the positional relationship between an annular groove of a cutting roller and a protrusion of a comb plate according to an embodiment.
Figure 2B:
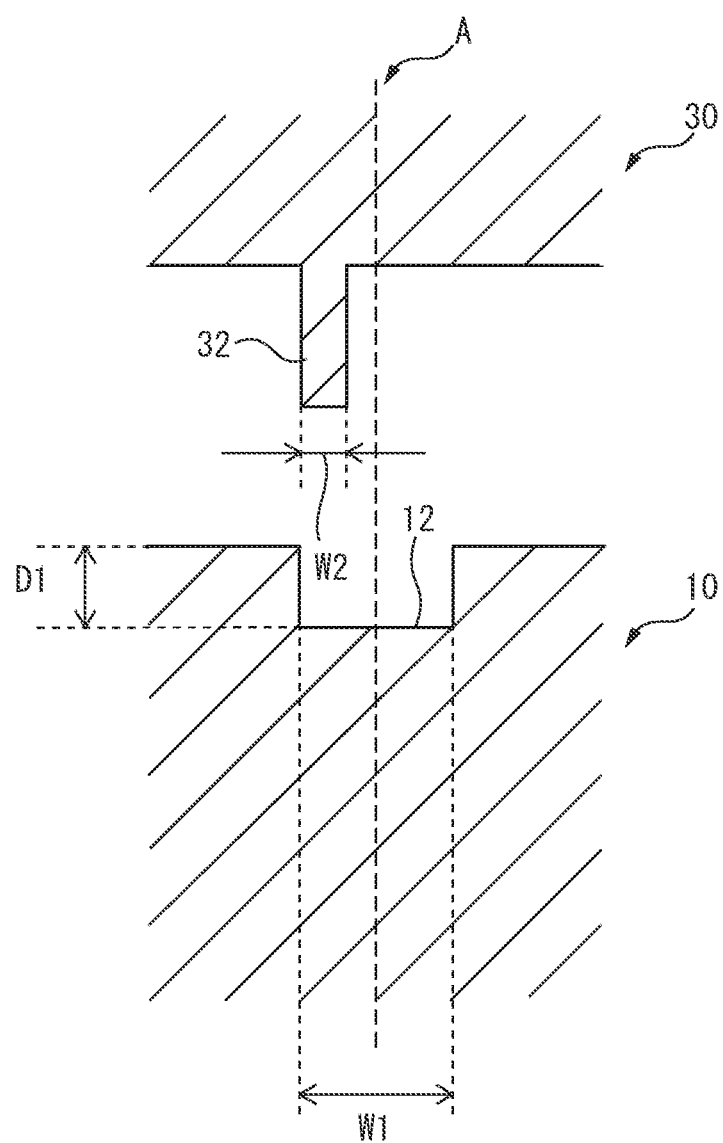
FIG. 2B is a schematic cross-sectional view showing the positional relationship between an annular groove of a cutting roller and a protrusion of a comb plate according to another embodiment.
Figure 2C:
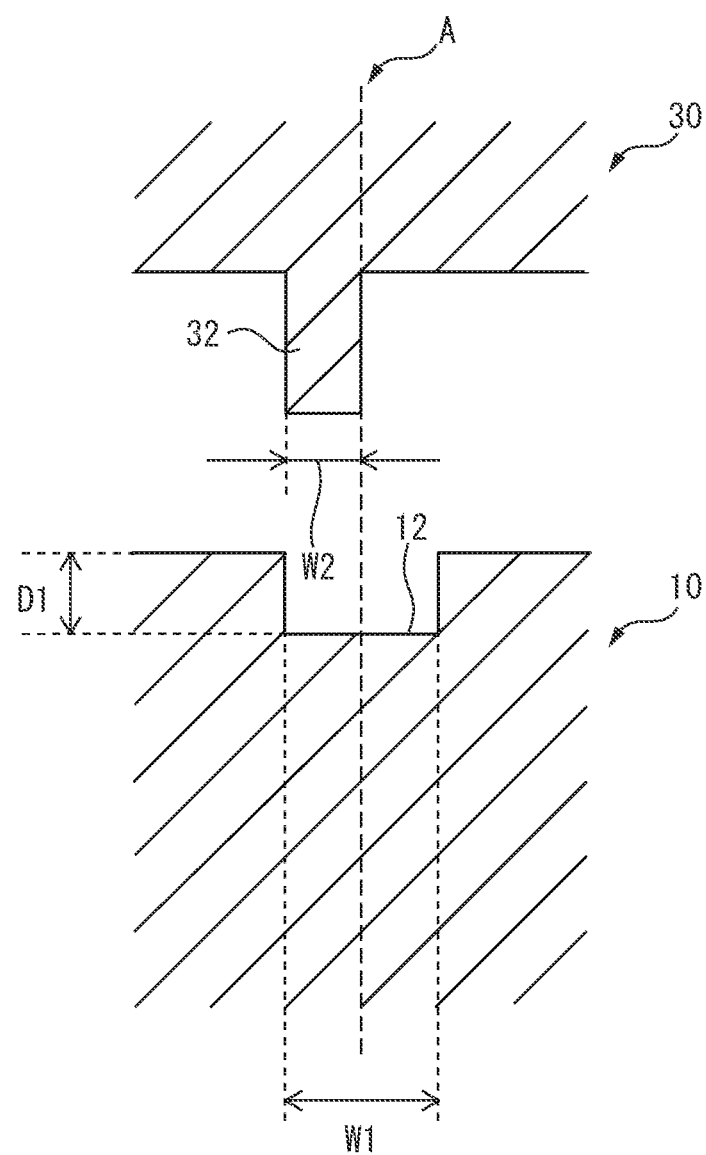
FIG. 2C is a schematic cross-sectional view showing the positional relationship between an annular groove of a cutting roller and a protrusion of a comb plate according to yet another embodiment.

FIGS. 2A to 2C show examples of a protrusion of a comb plate which is arranged shifted from the center of the annular groove of a cutting roller. In FIG. 2A, the center line A of the annular groove 12 of the cutting roller 10 does not coincide with the center line B of the protrusion 32 of the comb plate 30. In FIG. 2B, the protrusion 32 of the comb plate 30 is not present on the center line A of the annular groove 12 of the cutting roller 10. In FIG. 2C, one side of the protrusion of the comb plate 30 coincides with the center line A of the annular groove 12 of the cutting roller 10.

Figure 5:
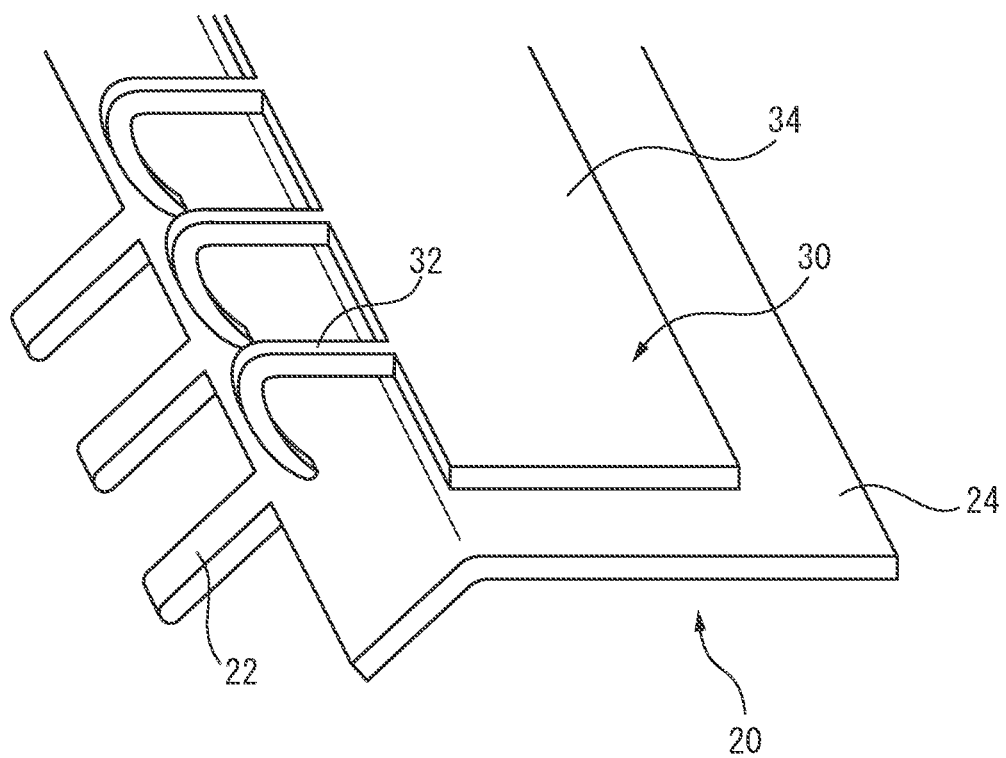
FIG. 5 is a schematic perspective view of a comb plate and a scraper according to an embodiment.

In an embodiment, as shown in the schematic perspective view of FIG. 5, the comb plate 30 comprises a plate-shaped part 34 which extends along the longitudinal direction of the cutting rollers, and a plurality of protrusions 32 extending on a long side of the plate-shaped part 34 in a direction substantially orthogonal to the long side, and the plate-shaped part 34 of the comb plate 30 is arranged overlaid on the plate-shaped part 24 of the scraper 20. The plate-shaped part of the comb plate and the plate-shaped part of the scraper may be overlapped with each other, and the comb plate and the scraper may be affixed to a housing together with bolts or the like.

The plurality of protrusions of the comb plate may extend straight or may include a bent portion or a curved portion. The corners of the plurality of protrusions may be chamfered.

The comb plate can be obtained by forming comb-shaped notches on one side of one plate to form the plurality of protrusions. The plate may be bent so as to have one or more obtuse angles, and a portion corresponding to the boundary between the plurality of protrusions and the plate-shaped part may be bent or curved. The comb plate can also be formed using a resin molding technique, such as compression molding, injection molding, or casting. In FIG. 3, the comb plate is composed of one piece, but the comb plate may be formed by overlapping two or more members having protrusions.

As the material of the comb plate, for example, metallic materials, such as brass, phosphor bronze, and stainless steel, rubbers, such as natural rubber, styrene butadiene rubber (SBS), and silicone rubber, or thermoplastic resins, such as an acrylic resin, can be used. Brass, phosphor bronze, rubber, and plastic are easy to process, and stainless steel has excellent durability. The surfaces of the plurality of protrusions may be plated with nickel or the like, or coated with a fluororesin or the like.

In an embodiment, the plurality of protrusions of the comb plate have a raised shape which imparts a force onto the noodle strand in a direction orthogonal to a direction of travel and width direction of the noodle strand which has been scraped from the cutting roller and separated from the scraper. Examples of the cross-sectional shape of the protrusions having a raised shape along the direction of travel of the noodle strands include a hook-shaped bent shape, a semicircular or arched shape, a triangular shape, a trapezoidal shape, etc. FIGS. 1, 3 and 5 show protrusions 32, 32a, 32b having hook-shaped cross sections along the direction of travel of the noodle strands.

In an embodiment, the width of the plurality of protrusions of the comb plate is 50% or less of the width of the annular grooves of the cutting rollers. FIGS. 2A to 2C show aspects in which the width W2 of the plurality of protrusions of the comb plate is 50% or less of the width W1 of the annular grooves of the cutting rollers. The width W2 of the plurality of protrusions of the comb plate is less than 50% of the width W1 of the annular grooves of the cutting rollers in FIGS. 2A and 2B, and is 50% of the width W1 of the annular grooves of the cutting rollers in FIG. 2C. The width of the plurality of protrusions of the comb plate may be 45% or less, 40% or less, or 33% or less and 5% or more, 15% or more, or 30% or more of the width of the annular grooves of the cutting rollers. In an embodiment, the width of the plurality of protrusions of the comb plate is 5% to 45%, 15% to 40%, or 30% to 33% of the width of the annular grooves of the cutting rollers.

Figure 6:
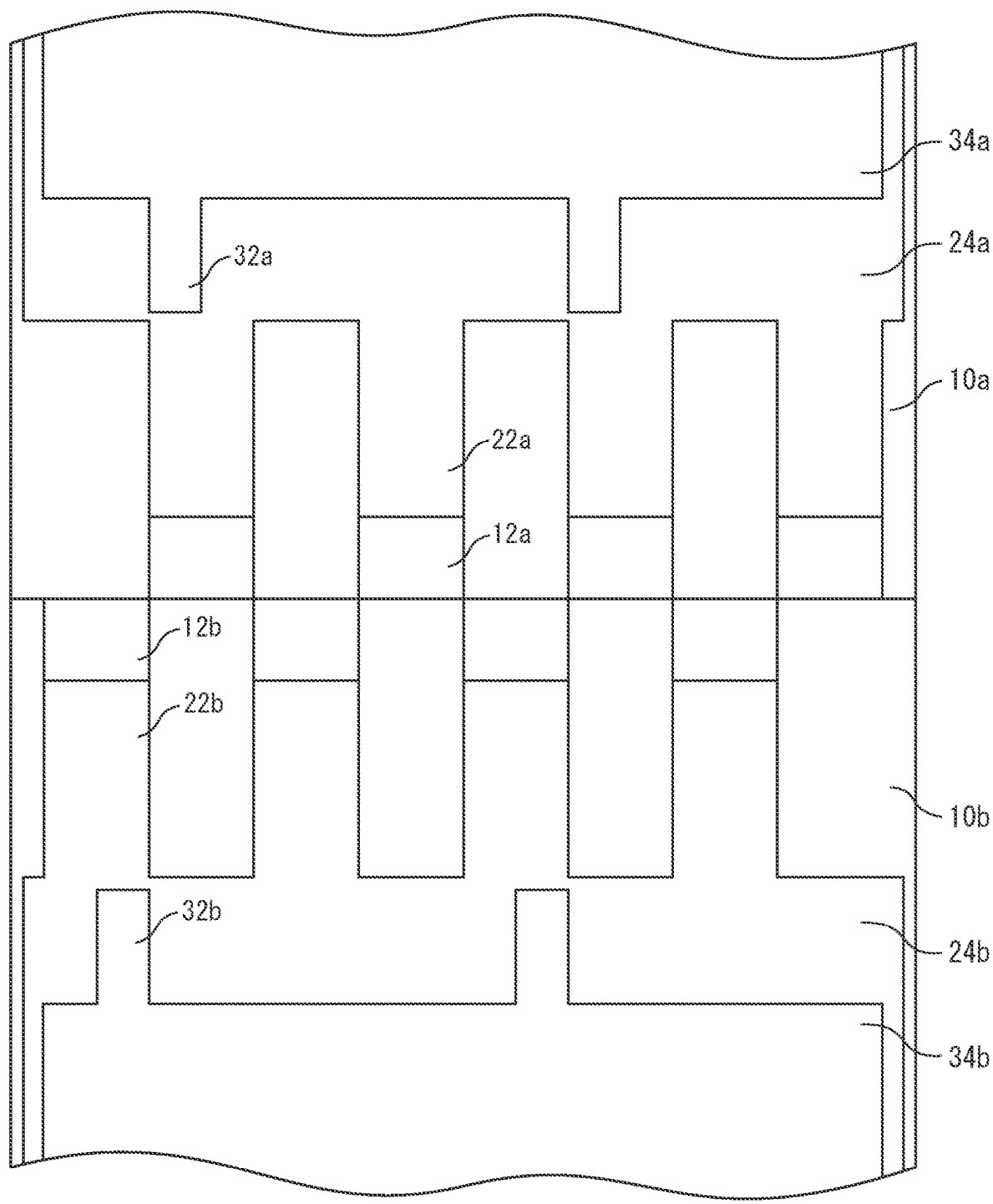
FIG. 6 is a schematic plan view of a noodle strand cutting device according to a second embodiment as viewed from the front of the side where the noodle strands are output.

In a second embodiment, the plurality of protrusions of the comb plate are alternatingly arranged with respect to the plurality of annular grooves of the cutting rollers. FIG. 6 shows a schematic plan view of the noodle strand cutting device of this embodiment as viewed from the front of the side where the noodle strands are output. In FIG. 6, the plurality of protrusions 22a, 22b of the scrapers engage with the plurality of annular grooves 12a, 12b of the cutting rollers 10a, 10b, and the plurality of protrusions 32a, 32b of the comb plates are alternatingly arranged with respect to the plurality of annular grooves 12a, 12b of the cutting rollers 10a, 10b. Though a certain noodle strand in one noodle strand bundle comes into contact with a protrusion of the comb plate and the orientation thereof is changed in this embodiment, the noodle strands adjacent to that noodle strand of the same noodle strand bundle do not contact the protrusions of the comb plates and the orientations thereof are not changed. Thus, the wide parts of that noodle strand and the noodle strands adjacent thereto do not come into contact with each other. As a result, adhesion between the noodle strands of the two noodle strand bundles can be reduced or prevented, and adhesion between adjacent noodle strands contained in one noodle strand bundle can also be reduced or prevented.

Furthermore, in the second embodiment, a shift occurs in the direction of travel of the noodle strands (the directions of the velocity vector of the noodle strands just before and immediately after the noodle strands come into contact with the protrusions of the comb plate) or the period or phase of the crimping, between the noodle strands that have come into contact with the protrusions of the comb plates and the noodle strands that have not come into contact therewith. Specifically, when the noodle strands come into contact with the protrusions of the comb plate, the direction of travel of the noodle strands changes in some cases, or the progress of the noodle strands may be delayed and the period or phase of the crimping of the noodle strands may be changed. Thus, the regularity of the direction of travel or the regularity of the period or phase of the crimping of the noodle strands contained in one noodle strand bundle can be lost, whereby the noodle strand mass per unit length of the noodle strand bundle can be made more uniform. Generally, in the production of noodle products, in the step of cutting noodle strands into single meal units, in consideration of production errors and the like, the noodle strands are cut at, for example, 105% of the single meal amount as a target value, so that the mass of noodle strands does not fall below the single meal amount. By making the noodle strand mass per unit length of the noodle strand bundle more uniform, it is possible to reduce production errors which should be considered in the step of cutting the noodle strands into single meal units. As a result, the noodle strands can be cut at a target value closer to the single meal amount, i.e., a target value closer to 100%, whereby the production cost of the noodle product can be effectively reduced.

The effect of the noodle strand mass per unit length of the noodle strand bundle being more uniform can be obtained not only for wide noodles, but also for narrower noodle strands. hi narrow noodle strands, though the effect of reducing or preventing adhesion between noodle strands due to the change in the orientation of the noodle strands is considered to be small or substantially nonexistent, a shift in the direction of travel of the noodle strands or the period or phase of the crimping of the noodle strands contained in the noodle strand bundle occurs in the same manner as for wide noodles. Thus, even in a noodle product containing narrow noodle strands, the noodle strands can be cut at a target value closer to the single meal amount, i.e., a target value closer to 100%, whereby the production cost of the noodle product can be reduced. In the second embodiment, the width of the annular grooves may be 0.75 mm or more, 1.0 mm or more, or 1.25 mm or more, and may be 30 mm or less, 15 mm or less, or 10 mm or less. For example, the width of the annular grooves can be 0.75 mm to 30 mm, 1.0 mm to 15 mm, or 1.25 mm to 10 mm.

In FIG. 6, when the direction in which the plurality of protrusions 22a, 22b of the scrapers extend from the plate-shaped parts 24a, 24b of the scrapers is defined as an upward direction, all of the protrusions 32a, 32b of the comb plates are shifted to the right from the centers of the annular grooves 12a, 12b when viewed from the side of the plate-shaped parts 34a, 34b of the comb plates. In the embodiment shown in FIG. 6, among the noodle strands of the upper noodle strand bundle cut by the cutting roller 10a and the noodle strands of the lower noodle strand bundle cut by the cutting roller 10b, the orientations of the noodle strands which contact the protrusions 32a, 32b of the comb plates rotate in the same direction in a plane orthogonal to the direction of travel of the noodle strands, i.e., clockwise in that plane. In other words, in the embodiment shown in FIG. 6, the orientations of some of the noodle strands of the upper noodle strand bundle cut by the cutting roller 10a are changed when the left sides thereof in FIG. 6 contact the protrusions 32a of the comb plate, and conversely, the orientations of some of the noodle strands of the lower noodle strand bundle cut by the cutting roller 10b are changed when the right sides thereof in FIG. 6 contact the protrusions 32b of the comb plate. As a result, when directly viewed from the top of the conveyor, the upper noodle strand bundle and the lower noodle strand bundle are stacked in a state in which the orientations thereof are changed in opposite directions. In some other embodiments, all of the protrusions 32a are shifted to the right from the centers of the annular grooves 12a, and all of the protrusions 32b are shifted to the left from the centers of the annular grooves 12b; all of the protrusions 32a are shifted to the left from the centers of the annular grooves 12a, and all of the protrusion 32b are shifted to the right from the centers of the annular grooves 12b; or alternatively, the protrusions 32a, 32b are all shifted to the left from the centers of the annular grooves 12a, 12b.

In the second embodiment, each of the plurality of protrusions of the comb plates may be shifted from the center of the annular groove on a side different from that of a protrusion adjacent along the longitudinal direction of the cutting rollers. For example, when the direction in which the plurality of protrusions of the scrapers extend from the plate-shaped parts of the scrapers is defined as an upward direction, in the case in which one protrusion of a comb plate is shifted to the right from the center of the annular groove when the noodle strand cutting device is viewed from the front of the side where the noodle strands are output, one or two adjacent protrusions along the longitudinal direction of the cutting roller may be shifted to the left from the center(s) of the annular groove(s) and vice versa.

In the second embodiment, each of the plurality of protrusions of the comb plates may be shifted from the center of the corresponding annular groove of the plurality of annular grooves to a non-regular side, may be shifted at an irregular distance, or may be shifted by a combination of these.

In an embodiment, the noodle strand cutting device further comprises a guide which receives the cut noodle strands. Any known guide which is used in noodle strand cutting devices and which has a function of receiving noodle strands scraped from the cutting roller by the scraper and thereafter directing the noodle strands onto a conveyor can be used as the guide. The guide may further comprise a divider which divides the noodle strand bundle, arranged along the longitudinal direction of the cutting roller. The guide is generally arranged, directly below or diagonally below the pair of cutting rollers and between the pair of cutting rollers and the conveyor, vertically so that the noodle strands move vertically, or inclined so that the noodle strands move diagonally downward.

The guide is generally gutter-shaped, plate-shaped, or tubular and can be formed using a material, such as stainless steel or plastic. The upper side of the guide may be open. or a lid which can be opened and closed and which can adjust the height of the opening may be disposed on the upper side of the guide. The lid may be attached to the guide, integrally formed with the guide, or attached to a portion separate from the guide, such as a housing equipped with the cutting rollers. The guide and the lid may be made of the same material or may be made of different materials. For example, when the guide is made of stainless steel, the lid may be a sheet made of soft plastic or silicone rubber.

A conveyor can be arranged directly below the cutting rollers or below the outlet of the guide. The conveyor is not particularly limited, and may be a wire mesh conveyor, net conveyor, belt conveyor, etc. The cut noodle strands are transferred onto the conveyor either directly or via the guide. The two noodle strand bundles formed by the pair of cutting rollers are stacked vertically on the conveyor or guide and transferred to subsequent steps for processing.

The transfer speed of the conveyor arranged directly below the noodle strand cutting device is generally less than the rotational speed of the cutting rollers, i.e., less than the cutting speed of the noodle strands. The noodle strands which are scraped from the cutting rollers by the scrapers and the orientations of which have been changed by the comb plates or have not been changed, when transferred onto the conveyor, or while moving on the guide, are crimped due to resistance caused by the difference between the transfer speed of the conveyor and the cutting speed of the noodle strands. The state of such crimped noodle strands may be expressed as "wavy" from the shape thereof. When guiding the noodle strands onto the conveyor via a guide having an upper lid, since the noodle strands are crimped in the more constrained space defined by the guide and the lid, the degree of crimps of the noodle strands, i.e., the magnitude of the "waviness" can be made more uniform. When a guide with an upper lid is not used, it is desirable to arrange the conveyor directly under the cutting rollers in order to form crimps in the noodle strands. When the cutting rollers and the conveyor are spaced apart, the noodle strands may not be crimped. Since the distance between the cutting rollers and the conveyor for forming crimps in the noodle strands depends on the raw materials of the noodle strands, production conditions, etc., the conveyor may be "directly below" the cutting rollers to the extent that the noodle strands are crimped. The arrangement of the conveyor and the distance between the cutting rollers and the conveyor are not limited when forming crimps in the noodle strands using a guide having an upper lid.

Figure 7A:
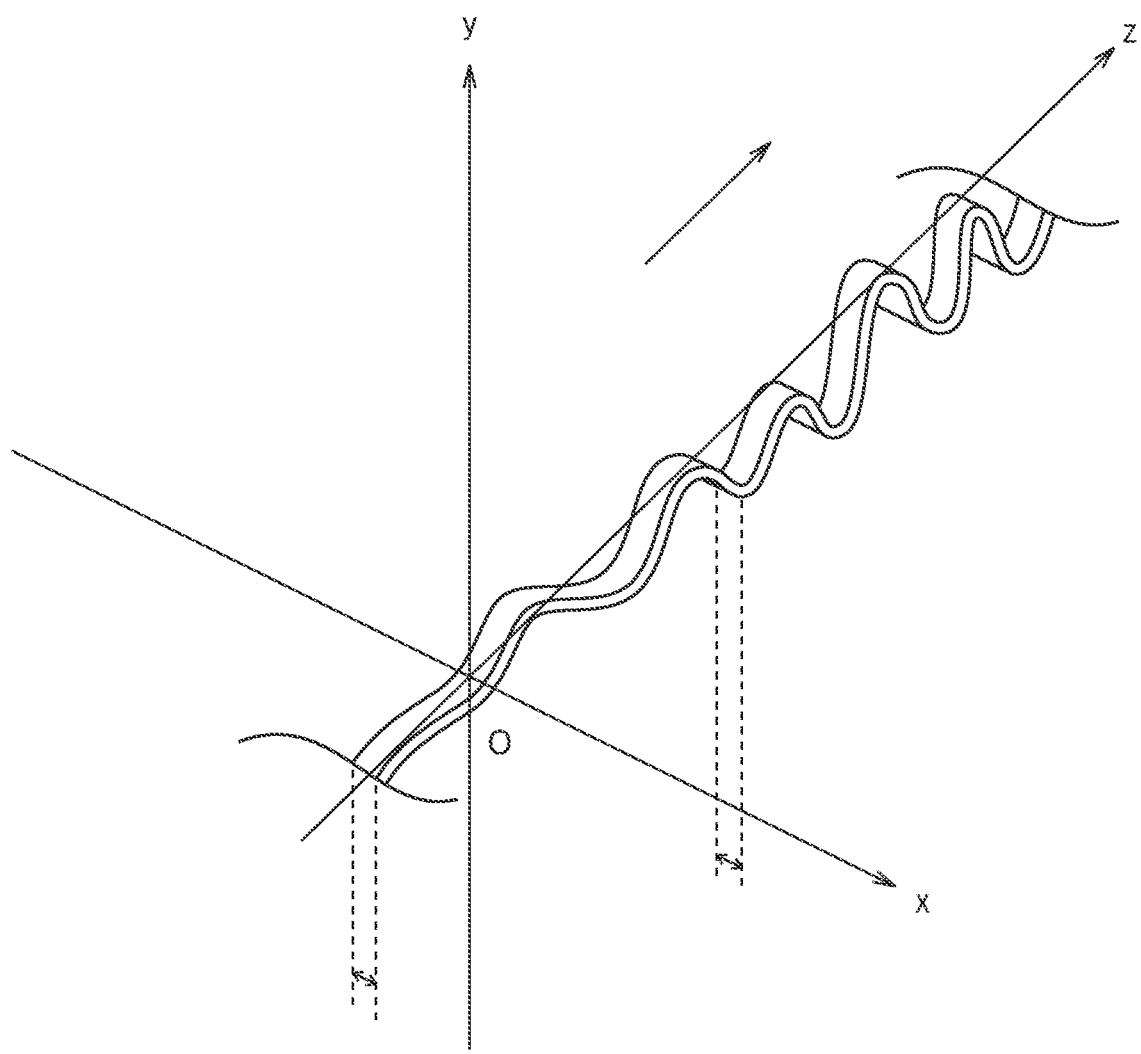
FIG. 7A is a schematic perspective view detailing the direction in which a noodle strand is crimped when there is no comb plate.

The difference in noodle strand crimping in the presence or absence of a comb plate will be described with reference to FIGS. 7A and 7B. FIG. 7A is a schematic perspective view detailing the direction in which the noodle strand is crimped when there is no comb plate, and FIG. 7B is a schematic perspective view detailing the direction in which the noodle strand is crimped when the orientation thereof is changed by a comb plate.

In FIG. 7A, the orientation of the noodle strand traveling in the direction of the arrow along the z direction is not changed at the origin O, i.e., it is not rotated in the plane (x-y plane) orthogonal to the direction of travel of the noodle strand. This is illustrated in FIG. 7A by the double-headed arrows indicating the orientation of the noodle strand interposed between the two leader lines pointing in the same direction at both the negative and positive positions of the z-axis. Since the noodle strand is crimped in the y direction, in a state in which two noodle strand bundles are stacked in the vertical direction (y direction), the contact area between the wide parts of the noodle strands of the upper noodle strand bundle and the wide parts of the lower noodle strand bundle is large, whereby these noodle strands are likely to adhere to each other.

Figure 7B:
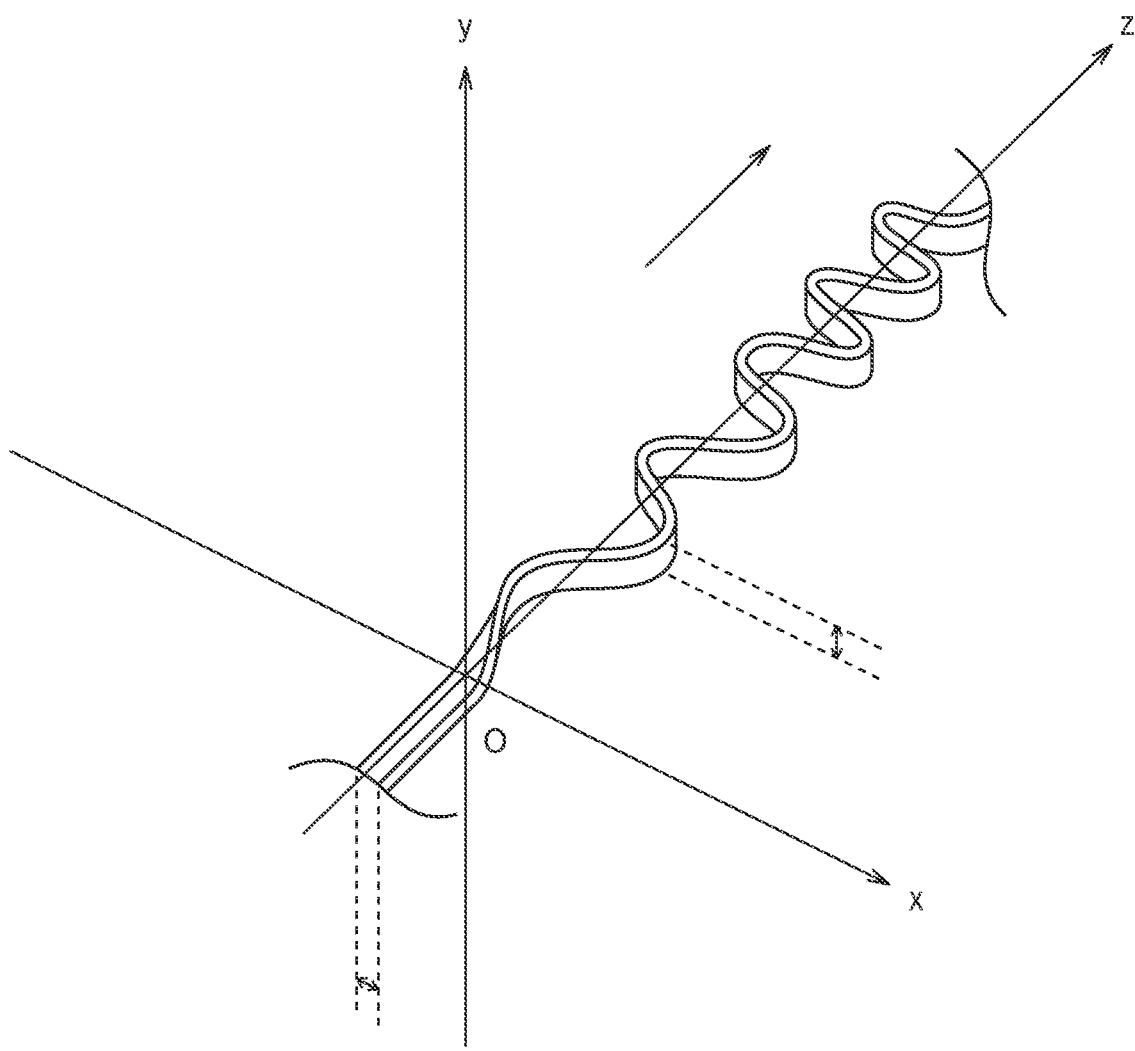
FIG. 7B is a schematic perspective view detailing the direction in which a noodle strand is crimped when the orientation thereof is changed by a comb plate.

In FIG. 7B, the orientation of the noodle strand traveling in the direction of the arrow along the z direction is rotated from the x-axis to the y-axis in a plane (x-y plane) orthogonal to the direction of travel of the noodle strand by the protrusion of the comb plate arranged in the origin O. This is illustrated in FIG. 7B by the double-headed arrows indicating the orientation of the noodle strand interposed between the two leader lines pointing in different directions at the negative position (before the noodle strand contacts the protrusion of the comb plate) and the positive direction (after the noodle strand contacts the protrusion of the comb plate) of the z axis. Since the noodle strand twisted at the origin O is crimped in the x direction due to this rotation, in a state in which two noodle strand bundles are stacked in the vertical direction (y direction), the wide parts of the noodle strands of the noodle strand bundle that have been crimped in the x direction do not come into contact with the noodle strands of the other noodle strand bundle, whereby adhesion between these noodle strands can be effectively reduced or prevented.

When steaming the noodle strands, a conveyor which transfers the noodle strand bundle at a slightly higher speed than the conveyor described above may be arranged immediately after the conveyor or in a subsequent step. When steaming, if the density of crimps is too high, the noodle strands may bind to each other due to gelatinization of the surfaces of the noodle strands. However, even if the noodle strand bundle, in which the density of crimping is sparse enough to prevent the binding between noodle strands, is attempted to be made only by the cutting speed of the cutting rollers and the transfer speed of the conveyor, it may be difficult to create crimps of a suitable shape. Thus, on the conveyor immediately after the noodle strand cutting device, a noodle strand bundle having dense crimping is produced, and thereafter, it can be transferred to a conveyor which transfers the noodle strand bundle at a slightly higher speed before steaming, whereby the density of crimps can be reduced to the extent that the noodle strands do not bind to each other during steaming. By the slightly increased conveyor speed, the production efficiency of subsequent steps can be improved. The present invention can further reduce the binding between noodle strands which occurs when the conveyor passes through a steamer as compared to the prior art.

Figure 8:
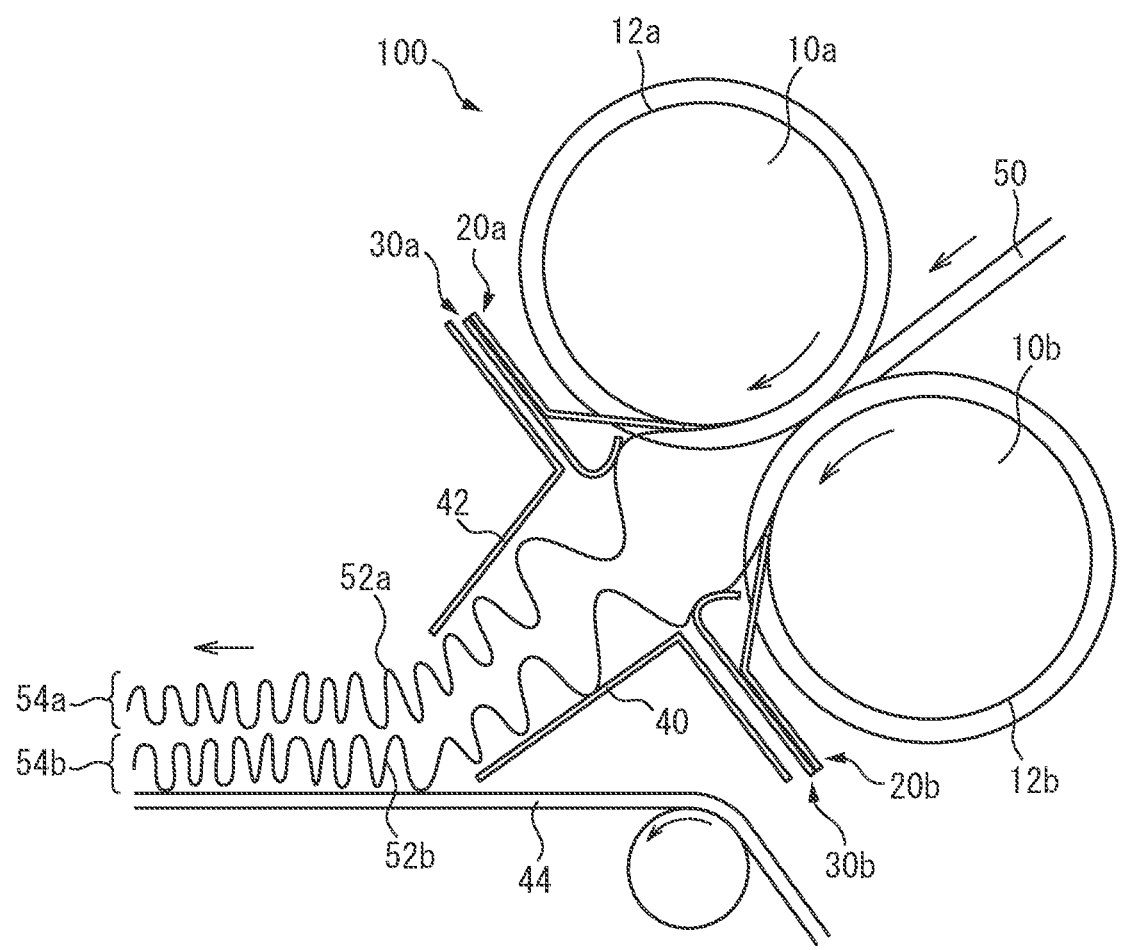
FIG. 8 is a schematic cross-sectional view detailing a noodle strand cutting process using the noodle strand cutting device according to an embodiment.

FIG. 8 shows a schematic cross-sectional view detailing a noodle strand cutting process using the noodle strand cutting device 100 according to an embodiment. A noodle belt 50 passes between the pair of cutting rollers 10a, 10b which rotate in directions opposite to each other. The cutting rollers 10a, 10b cut the noodle belt 50 into a respective plurality of noodle strands 52a, 52b. The noodle strands 52a, 52b in the annular grooves 12a, 12b of the cutting rollers 10a, 10b are scraped from the cutting rollers 10a, 10b by the protrusions (with respect to which reference signs are not shown) of the scrapers 20a, 20b and formed into an upper noodle strand bundle 54a and a lower noodle strand bundle 54b, respectively, and progress diagonally downward. Thereafter, the noodle strands 52a, 52b come into contact with the protrusions (with respect to which reference signs are not shown) of the comb plates 30a, 30b, and the orientations of the noodle strands 52a, 52b are rotated in a plane orthogonal to the direction of travel of the noodle strands 52a, 52b. A guide 40 and a lid 42 are arranged diagonally below the cutting rollers 10a, 10b and between the cutting rollers 10a, 10b and a conveyor 44. The noodle strands 52a, 52b are crimped due to the difference between the transfer speed of the conveyor 44 and the rotation speeds of the cutting rollers 10a, 10b, i.e., the cutting speed of the noodle strands, while passing through the constrained space defined by the guide 40 and lid 42. In FIG. 8, though the direction of crimping of the noodle strands 52a, 52b is the upward and downward directions in order to facilitate illustration, since the orientations of the noodle strands 52a, 52b are changed, the noodle strands 52a, 52b are actually crimped along a direction perpendicular to the sheet of the drawing. hi the interior or outlet of the guide 40, the upper noodle strand bundle 54a containing the noodle strands 52a and the lower noodle strand bundle 54b containing the noodle strands 52b are overlapped and transferred to a subsequent step, such as steaming, by the conveyor 44.

A noodle production apparatus of an embodiment comprises the noodle strand cutting device described above. The noodle production apparatus may comprise a main ingredient and auxiliary ingredient supply device, such as a hopper, a mixing device for kneading the main ingredient and auxiliary ingredients, such as a kneader and a planetary mixer, an extruder, rolling rollers and a compound machine for forming a noodle belt from dough, a conveyor which transfers noodle strand bundles, a steamer which gelatinizes starch contained in the noodle strands, a cutting machine which cuts the noodle strand bundles to the length of one serving, a fry-dryer or hot-air dryer, a packaging machine, etc.

A method for producing noodles of an embodiment comprises cutting a noodle belt formed from dough into a plurality of noodle strands using the noodle strand cutting device described above.

A method for producing instant noodles of an embodiment comprises cutting a noodle belt formed from dough into a plurality of noodle strands using the noodle strand cutting device described above, steaming and gelatinizing the plurality of cut noodle strands, and drying the gelatinized noodle strands. The instant noodles may be flied noodles or hot-air dried noodles.

The present invention is not limited to only the embodiments described above, and various modifications, addition of constituent elements, or improvements can be made to the present invention within the scope of the spirit thereof.

REFERENCE SIGNS LIST 100 noodle strand cutting device
10, 10a, 10b cutting roller
12, 12a, 12b annular groove
20, 20a, 20b scraper
22, 22a, 22b protrusion of scraper
24, 24a, 24b plate-shaped part of scraper
30, 30a, 30b comb plate
32, 32a, 32b protrusion of comb plate
34, 34a, 34b plate-shaped part of comb plate
40 guide
42 lid
44 conveyor
50 noodle belt
52a, 52b noodle strand
54a upper noodle strand bundle
54b lower noodle strand bundle

The invention claimed is:

1. A noodle strand cutting device, comprising:
a pair of cutting rollers, each having a plurality of annular grooves, which are arranged in parallel so that the annular grooves of one cutting roller face and mesh with those of the other cutting roller,
a scraper comprising a plate-shaped part which extends along a longitudinal direction of the cutting rollers and a plurality of protrusions extending on a long side of the plate-shaped part in a direction substantially orthogonal to the long side, each of the plurality of protrusions being configured so as to engage with a corresponding one of the plurality of annular grooves of the cutting rollers so that noodle strands in the plurality of annular grooves are scraped from the cutting rollers, and
a comb plate having a plurality of protrusions which are arranged so as to be shifted from the centers of the plurality of annular grooves along the longitudinal direction of the cutting rollers, the plurality of protrusions being configured so as to contact the noodle strands at positions where the noodle strands are not in contact with the cutting rollers and the plurality of protrusions of the scraper.

2. The noodle strand cutting device according to claim 1, wherein the plurality of protrusions of the comb plate have a raised shape which imparts a force onto the noodle strand in a direction orthogonal to a direction of travel of the noodle strand, which has been scraped from the cutting roller and separated from the scraper, and the width direction of the noodle strand.

3. The noodle strand cutting device according to claim 1, wherein the comb plate comprises a plate-shaped part which extends along the longitudinal direction of the cutting rollers and the plurality of protrusions on a long side of the plate-shaped part which extend in a direction substantially orthogonal to the long side, and the plate-shaped part of the comb plate is arranged overlaid on the plate-shaped part of the scraper.

4. The noodle strand cutting device according to claim 1, wherein the plurality of protrusions of the comb plate are alternatingly arranged with respect to the plurality of annular grooves of the cutting rollers.

5. The noodle strand cutting device according to claim 1, wherein the width of the annular grooves of the cutting rollers is 2.0 mm or more.

6. The noodle strand cutting device according to claim 1, wherein the width of the plurality of protrusions of the comb plate is 50% or less the width of the annular grooves.

7. The noodle strand cutting device according to claim 1, further comprising a guide for receiving the cut noodle strands.

8. A noodle production apparatus comprising the noodle strand cutting device according to claim 1.

9. A method for producing noodles, comprising cutting a noodle belt formed from dough into a plurality of noodle strands using the noodle strand cutting device according to claim 1.

10. A method for producing instant noodles, comprising:
cutting a noodle belt formed from dough into a plurality of noodle strands using the noodle strand cutting device according to claim 1;
steaming and gelatinizing the plurality of cut noodle strands; and
drying the gelatinized noodle strands.

* * * * *